Patented Aug. 11, 1931

1,818,662

UNITED STATES PATENT OFFICE

ROTHE WEIGEL AND HENRY W. EASTERWOOD, OF NASHVILLE, TENNESSEE, ASSIGNORS TO VICTOR CHEMICAL WORKS, A CORPORATION OF ILLINOIS

MANUFACTURE OF PHOSPHORUS AND PHOSPHORUS COMPOUNDS BY VOLATILIZATION PROCESSES

No Drawing. Application filed March 18, 1929. Serial No. 348,115.

The present invention relates to the production of phosphorus and phosphorus compounds by the volatilization processes, and more particularly to the production of phosphorus or phosphorus pentoxide from natural phosphate minerals in the blast furnace process.

It has hitherto been proposed in connection with the volatilization processes of reducing minerals containing phosphorus, such as phosphate rock, to grind and form into briquettes the phosphorus-containing mineral, together with the necessary amounts of silicious and carbonaceous material to react with the mineral and free the phosphorus content thereof. These briquettes are then charged into the volatilization furnace, and, in the blast furnace operation, the necessary additional coke or carbon for heating and providing a reducing atmosphere in the furnace is likewise charged in, and the operation conducted in the usual manner. In the blast furnace operation the conditions as to temperatures in the furnace of the blast, etc., are substantially those which prevail in ordinary pig iron blast furnace operations, the phosphorus being volatilized (oxidized if desired), and passing off with the blast furnace gases and a molten slag being formed and drawn off from the bed of the furnace.

The mechanical reduction of the constituents of the briquettes, their thorough intermixture and the close proximity of the particles resulting from the briquetting operation are effective in the direction of securing rapid and complete reduction of the phosphorus mineral.

It has now been found, however, that operations in the manner hitherto practiced, while advantageous in principle and adequate for small scale furnace operations, lead to difficulties in continuous large scale operation, such as takes place, for example, in blast furnaces comparable in size with those ordinarily used in the manufacture of pig iron. In such operations, by reason of the difficulties attendant upon shutting down and restarting a furnace, it is necessary to secure complete continuity of operation and to have a flexibility of control in operation which will permit of overcoming unexpected undesirable conditions in operation, such as hanging, scaffolding, chilling, high viscosity of slag and the like.

We have found that by the procedure hereinafter described, we are enabled to secure a flexible control of the operations in volatilization processes for the production of phosphorous, particularly adaptable to blast furnace operations and we are enabled to secure continuous operation of such furnaces, even of the largest size, and to overcome, without stopping the operation of the furnace, the unexpected and undesirable difficulties occurring therein such as those previously described. At the same time we are able to secure the advantages in operation attendant upon the use of briquetted charges.

In accordance with our invention, we prepare briquettes of substantially constant average composition containing the phosphorus mineral, and the necessary carbonaceous material for the reduction of the phosphorus therein, and may include therein a portion of the silicious material required for facilitating the liberation of the phosphorus and producing the slag. Ordinarily, however, we prefer to include in the briquettes only the silicious material normally contained in the phosphorus mineral. The constituents of the briquettes are previously reduced mechanically, for example, to a 20 to 40 mesh size, although some finer material may be included, if desired. The carbonaceous material included in the briquettes is preferably sufficient for or in excess of the amount necessary for reduction of the phosphorus in the mineral and may be any suitable carbonaceous substance, such as coke, anthracite coal or bituminous coal.

The following specific description illustrates the present invention as carried out with a typical phosphate rock, such as Tennessee rock, in a blast furnace operation. The run of mine rock, as received, may contain approximately 24% $P_2O_5$, 10 to 13% iron and aluminum oxides, 18 to 20% $SiO_2$, and 30 to 32% $CaO$, together with small amounts of moisture and other constituents, as shown by the usual proximate analysis. The rock is ground, suitably to 30 to 40 mesh, and mixed with similarly ground coal in amount to supply an excess of carbonaceous material over that calculated for reduction of the phosphorus in the phosphate rock. Any suitable binder may be used in the briquetting operation, for example, sulphite liquor, molasses or other like organic binding material. For example, with rock of the average composition above set forth, the briquettes may suitably be formed of 76 parts ground rock, 15 parts of ground coal having 5 to 10% ash, and 2 parts of sulphite liquor containing 50% solids, the whole being mixed, briquetted and the briquetes dried.

The blast furnace, which is started with coke and slag, as is customary in pig iron blast furnace practice, is fed with these briquettes together with additional silica, preferably in pebble form, and the requisite coke for fuel. The proportion of additional silicious material required is calculated as in ordinary blast furnace practice to give a readily fusible fluid slag; for example, to maintain a ratio of $SiO_2$ to $CaO$ of 0.8. Thus, with briquettes of the constant average composition above set forth, the proportions of constituents in the furnace charge may be 240 to 260 parts by weight of briquettes, 7 to 20 parts pebble silica and 100 parts coke. In the normal operation of the blast furnace, these average proportions in the charge may be maintained. The ratio of $SiO_2$ to $CaO$ may of course be varied say from 0.6 to 1 to 1.2 to 1. By providing only a part of the requisite silicious material in the briquettes, however, we are enabled to vary the conditions of operation within the furnace, taking care of irregularities and operation which would otherwise choke or chill the furnace and force it to be closed down, by varying the proportions of additional silicious material and coke charged relative to the briquettes and while continuing to employ briquettes of the same average composition.

In the operation of the blast furnace, as is well understood in the art, the conditions with reference to furnace temperatures, blast temperatures, etc., are substantially the same as in blast furnace operations. The invention may likewise be employed in connection with electric furnace volatilization processes to advantage.

The illustration given above sets forth the specific details found suitable in connection with phosphate rock such as a run of mine rock found in certain portions of Tennessee. It is obvious that the invention may also be adapted by simple metallurgical calculation for use with other phosphate rocks which vary widely in composition, particularly as to content of $P_2O_5$, $CaO$ and $SiO_2$, as shown on proximate analysis, or with other natural phosphorus minerals. Other silicious materials than silica may be employed, if desired, such as clay or other silicates. However, the use of pebble silica is preferred.

We claim:

1. The method of producing phosphorus in a volatilization furnace which comprises commingling phosphorus-containing mineral and carbonaceous material and forming coherent briquettes thereof of constant average composition, charging such briquettes with additional separate silicious and carbonaceous material into the furnace to pass into the volatilization zone therein, and maintaining a temperature in said furnace to liberate phosphorus and form a molten slag.

2. The method of producing phosphorus in a volatilization furnace, which comprises commingling phosphorus mineral and carbonaceous material and forming coherent briquettes thereof of constant average composition, and charging such briquettes with additional separate silicious material to form a slag of desired composition into the furnace to pass through the volatilization zone therein, and maintaining a temperature in the furnace to liberate phosphorus and form a molten slag.

3. The method of producing phosphorus in a blast furnace which comprises commingling ground phosphate rock and carbonaceous material and forming coherent briquettes thereof, and charging such briquettes with carbonaceous material required for fuel and with additional separate silica to form a slag of desired composition into the furnace to pass therethrough, and maintaining a temperature in the furnace by combustion of said fuel to liberate phosphorus and form a molten slag.

4. The method of producing phosphorus in a blast furnace which comprises commingling ground phosphate rock and carbonaceous material and forming coherent briquettes thereof of constant average composition, said briquettes containing insufficient silicious material to form a slag of desired composition, and charging such briquettes with carbonaceous material in amount required for fuel and pebble silica in proportion to supply the requirements of a slag of desired composition, into the furnace to pass therethrough, maintaining a temperature in the furnace by combustion of carbonaceous material therein to liberate phosphorus and form a molten slag, and varying the proportions of silicious material fed to the furnace relative to the briquettes of constant average composition to secure the desired operating conditions.

5. The method of producing phosphorus in a volatilization furnace, which comprises commingling phosphorus-containing mineral and carbonaceous material and forming coherent briquettes thereof of constant average composition, charging such briquettes with additional silicious material into the furnace to pass through the volatilization zone therein, maintaining a temperature in the furnace to liberate phosphorus and form a molten slag, and altering the proportions of silicious material fed to the furnace relative to the briquettes of constant average composition to vary the conditions therein.

6. The method of producing phosphorus in a blast furnace which comprises commingling ground phosphate rock and carbonaceous material and forming coherent briquettes thereof of constant average composition, said briquettes containing insufficient silicious material to form a slag of desired composition, and charging such briquettes into the furnace with carbonaceous material in amount required for fuel and with pebble silica in proportion to provide a ratio of $SiO_2$ to $CaO$ of 0.6 to 1 to 1.2 to 1 to pass therethrough, maintaining a temperature in the furnace to sufficiently liberate phosphorus and form a molten slag by combustion of carbonaceous material therein.

7. The method of producing phosphorus in a blast furnace which comprises commingling ground phosphate rock and carbonaceous material and forming coherent briquettes thereof of constant average composition, said briquettes containing insufficient silicious material to form a slag of desired composition, and charging such briquettes into the furnace with carbonaceous material in amount required for fuel and with pebble silica in proportion to provide a ratio of $SiO_2$ to $CaO$ of 0.6 to 1 to 1.2 to 1 to pass therethrough, maintaining a temperature in the furnace to sufficiently liberate phosphorus and form a molten slag by combustion of carbonaceous material therein, and altering the proportions of silicious material fed through the furnace relative to the briquettes of average composition to maintain desired compositions therein.

8. Briquettes for use in manufacture of phosphorus by the volatilization process, said briquettes comprising ground phosphorus mineral, carbonaceous material in proportion suitable for the reduction of the phosphorus mineral, and containing less silicious material than is necessary for the formation of a fusible slag with the constituents of the phosphorus mineral.

9. Briquettes for use in the volatilization process for making phosphorus, said briquettes comprising ground phosphate rock and carbonaceous material in proportion suitable for the reduction of the phosphorus of the phosphate rock, said briquettes containing silica in proportion less than is necessary to provide a ratio of $SiO_2$ to $CaO$ of the phosphate rock of 0.6 to 1 to 1.2 to 1.

In testimony whereof, we have hereunto set our hands this 9th day of March, 1929.

ROTHE WEIGEL.
HENRY W. EASTERWOOD.